United States Patent
Igarashi et al.

(10) Patent No.: US 7,128,459 B2
(45) Date of Patent: Oct. 31, 2006

(54) LIGHT-GUIDE PLATE AND METHOD FOR MANUFACTURING THE SAME

(75) Inventors: Junichi Igarashi, Fukushima (JP); Koki Kunii, Fukushima (JP); Osamu Kitazawa, Fukushima (JP)

(73) Assignee: Nidec Copal Corporation, Tokyo (JP)

( * ) Notice: Subject to any disclaimer, the term of this patent is extended or adjusted under 35 U.S.C. 154(b) by 106 days.

(21) Appl. No.: 10/290,236

(22) Filed: Nov. 8, 2002

(65) Prior Publication Data

US 2003/0090887 A1    May 15, 2003

(30) Foreign Application Priority Data

Nov. 12, 2001 (JP) ............................ P2001-346212
Mar. 12, 2002 (JP) ............................ P2002-067390

(51) Int. Cl.
    *F21V 7/04* (2006.01)
(52) U.S. Cl. .................... 362/621; 362/607; 362/608; 362/620; 362/628; 349/63; 349/95
(58) Field of Classification Search .................. 362/31, 362/330, 339, 26, 561, 555, 244, 608, 609, 362/612, 613, 615, 616, 619, 620, 621, 622, 362/617, 606, 607, 603; 385/120, 901; 349/65
    See application file for complete search history.

(56) References Cited

U.S. PATENT DOCUMENTS

| | | | |
|---|---|---|---|
| 5,410,454 A * | 4/1995 | Murase et al. ............... | 362/611 |
| 5,944,405 A * | 8/1999 | Takeuchi et al. ............. | 362/617 |
| 6,290,364 B1 * | 9/2001 | Koike et al. ................... | 362/31 |
| 6,565,225 B1 * | 5/2003 | Mabuchi et al. ............. | 362/610 |
| 6,592,233 B1 * | 7/2003 | Parikka ........................ | 362/31 |
| 2003/0128538 A1 * | 7/2003 | Shinohara et al. ............ | 362/31 |
| 2004/0022050 A1 * | 2/2004 | Yamashita et al. ............ | 362/31 |

FOREIGN PATENT DOCUMENTS

| | | |
|---|---|---|
| JP | 55-138602 | 3/1979 |
| JP | 05-131542 | 5/1993 |
| JP | 07-117144 | 5/1995 |
| JP | 10-016048 | 1/1998 |
| JP | 10-062626 | 3/1998 |
| JP | 2925530 | 5/1999 |
| JP | 11-147255 | 6/1999 |
| JP | 2000-147499 | 5/2000 |
| JP | 2000147499 A * | 5/2000 |
| JP | 2000-221501 | 8/2000 |
| JP | 2001-023424 | 1/2001 |
| JP | 2001-110223 | 4/2001 |
| JP | 2001-194534 | 7/2001 |
| JP | 2001-277260 | 10/2001 |

* cited by examiner

*Primary Examiner*—Sandra O'Shea
*Assistant Examiner*—Guiyoung Lee
(74) *Attorney, Agent, or Firm*—McGinn IP Law Group, PLLC

(57) ABSTRACT

A light-guide plate (1) arranged at a display face (2a) of a liquid crystal (2) and illuminates radiating light from a light source (3) to the display face (2a) is constructed by a light permeability base portion (10) having a first face (8), a second face (9) of the rear face side of the first face (8), and a third face (5) guiding light from the light source (3) from side face, an adhesive layer (11), and light permeability sheet (12) forming plural prism grooves on a light emission face (6) with the predetermined interval and providing on the adhesive layer (11).

16 Claims, 11 Drawing Sheets

LIGHT-GUIDE PLATE AND METHOD FOR MANUFACTURING THE SAME

BACKGROUND OF THE INVENTION

The present invention relates to a light-guide plate and a method for manufacturing the same, for example, to so-called front light which is set at display front side of various kinds of reflective type display units and the like including a reflective type liquid crystal to illuminate.

A back light and a front light are proposed for illuminating a liquid crystal display board and the like. In these units, light is guided to a light-guide member by providing a light source at a side face of the light-guide member comprising a transparent board, and plane light emission is realized by diffusing the light by using a light emission pattern such as prism grooves and the like provided at the surface of the light-guide member. Such the light-guide member is called a light-guide plate because it is generally a flat shape.

A method for forming a light emission pattern on the light-guide member by injection molding method for example is known as a technique forming such the light emission pattern. However, there are problems in the technique that shape fault of the light emission caused by lack of filling up resin material generates and it has a limit to make the light-guide member thin.

The technique forming the light emission pattern by performing press working to material of the light-guide member is proposed in JP-11-147255 for example. The technique using the press working has effects reducing the shape fault and design thin light-guide member.

However, making the light-guide member thin by the light emission pattern using press working has problems that thickness of an incident part of light source becomes thin and usage efficiency decreases.

Recently, a front light is becoming the main current, which illuminates display plane of liquid crystal directly by arranging at display front side of a reflective type liquid crystal instead of the back light illuminating the transparent type liquid crystal from back side. A display unit constructed by the reflective type liquid crystal and the front light has advantages that angle of visibility is made large and power consumption is made little.

Constructions are known as the front light, which are disclosed in Japanese Patent No. 2,925,530, JP-A-2001-110223, and JP-A-2001-23424.

In the construction of each of the above official gazettes, a face facing a liquid crystal of light-guide plate is made flat, half-circular concave portions or convex portions of a saw-like prism shape or a triangle prism shape in section are formed at face of the opposite side, and incident light from the end face of the light-guide plate is totally reflected at these prism-shaped face. By these constructions, illumination is performed by letting the liquid crystal direct, and uniform illumination over whole plane is performed by radiating from light emission face. Further, the construction bonding with liquid crystal through a refraction layer having smaller refractive index than the light-guide plate is disclosed in JP-A-2000-221501.

On the other hand, it is known that a light-guide plate for a front light is molded integratedly by injection molding method using light permeability resin material such as polycarbonate, methyl polymethacrylate resin, and so on. The process thereof will be described simply referring the flowchart of FIG. 11A, first, size of an external form of a light-guide plate determined based on the product specification and known values of quantity of light source and directivity are inputted to a simulation program of a personal computer so as to design for trial computing ideal arrangement of prism grooves and numbers of arrangement in Step S10. Continuously, the light-guide plate is actually produced by hand-made based on the design for trial in Step S11. Then, it is judged whether density of quantity of light from light emission face is uniform or not by setting a light source on the trial piece in Step S12, and when it is uniform, an exclusive injection-molding die is produced advancing the next step S13.

On the other hand, when density of quantity of light from light emission face of the light-guide plate is not uniform in Step S12, the light-guide plate as produced for trial again returning to Step S11 and repeats Steps S11 and S12 till density of quantity of light becomes uniform.

Next to the above Step S13, molding using the produced injection-molding die is performed so as to finish molding of the light-guide plate advancing to Step S14. Continuously, setting the light source in Step S15, whether density of quantity of light from light emission face of the light-guide plate is uniform or not, when it is uniform, it is shipped as a product advancing to the next Step S17.

On the other hand, when it is decided that density of quantity of light from light emission face of the light-guide plate is not uniform in Step S15, correction of the injection-molding die is performed advancing to Step S16, and the light-guide plate is molded again returning to Step S14 and repeats Steps S15, S16 and S14 till density of quantity of light becomes uniform.

It is indispensable condition that the prism grooves 7 are molded exactly in valley shape having planes to perform reflection of light as shown in FIG. 11B for the light-guide plate 1 molded integratedly with the prism grooves 7 by going through the above processes.

However, according to resin injection molding method using the above injection molding die, the prism grooves 7 are possibly molded in valley shape having dull planes as shown in FIG. 11C depending on the shape of the prism grooves 7, a part of molding, and condition of injection molding. When the prism grooves 7 are molded integratedly in such the valley shape having dull planes, it can not be used as a light-guide plate 1.

Further, it is possibly difficult to mold the light-guide plate integratedly since deformation such as bending and the like caused by heat contraction after injection molding generates. Further more, there are defects that an injection-molding die requiring accuracy of micron order such a light-guide plate requires is considerably expensive and life of the die is short. Additionally, since the correction of die for the above injection molding needs considerable skill, there is a problem needing man-hour for the correction.

SUMMARY OF THE INVENTION

Therefore, an object of the invention is to realize making a light-guide member thin while keeping usage efficiency of a light source.

Further, an another object of the invention is to produce a light-guide plate requiring accuracy with a little man-hour without using an injection-molding die for molding the light-guide plate having prism grooves.

In order to solve the aforesaid object, the invention is characterized by having the following arrangement.

(1) A light-guide plate for a front light type liquid crystal display device comprising:
   a light permeability board; and a light permeability sheet including plural grooves and a light emission face, which laminated on the board.

(2) The light-guide plate according to (1), wherein the board and the sheet are joined by a light permeability adhesive agent.

(3) The light-guide plate according to (1), wherein
the board includes a front face arranged facing a liquid crystal display face, a rear face laminating the sheet and a side face receiving light from a light source, and
the plural grooves are prism grooves produced in a direction crossing at substantially right angle to light axis direction of the light form a light source.

(4) A method of manufacturing a light-guide plate for a front light type liquid crystal display device, the method comprising the steps of:
producing a light permeability sheet including a light emission face on which plural grooves are formed; and
laminating a light permeability board and the sheet.

(5) The method according to (4), wherein the producing step includes a step of forming the sheet by supplying a melted material on a first rotating roller and separating the formed sheet form the first rotating roller by a second rotating roller, and
wherein dies corresponding to the plural grooves are formed at a surface of the second rotating roller to form the groove on the sheet.

(6) The method according to (4), wherein
the producing step includes the step of press-working raw material sheet by using a die including models of the plural groove to produce the sheet in which the plural grooves are formed.

(7) The method according to (6) further comprising a step of heating the raw material sheet to higher than temperature of second order transition point and lower than temperature of melting point before the press working step.

(8) A method for manufacturing a light-guide member including a light emission portion and a light incident portion, the method comprising the steps of:
producing the light emission portion by forming a light emission pattern by press working on a board; and
forming the light incident portion integrally with the produced light emission portion.

(9) The method according to (8), wherein
the light incident portion and the light emission portion are molded integrally each other by joining the light incident portion, produced separated from the light emission portion, to the light emission portion.

(10) The method according to (8), wherein
the light emission portion is arranged at a predetermined die having a portion for forming the light incident portion and material for the light incident portion is introduced into the portion for forming the light incident portion and fixed so that the light incident portion and the light emission portion are molded integrally.

(11) The method according to (8), wherein
the light incident portion includes a light source side end portion arranged facing a light source and the end portion is thicker than the light emission portion.

(12) The method according to (8), wherein
the material for the light incident portion is light-curing resin or hear-curing resin.

(13) A light-guide member comprising:
a light emission portion in which a light emission pattern is formed on a board by press working; and
a incident portion integrally formed with the light emission portion.

(14) A light-guide member comprising:
a plate-shape light emission portion on which a light emission pattern is formed; and
a light incident portion which is formed integrally with the light emission portion and includes a light source side end portion arranged facing a light source, the end portion being thicker than the light emission portion.

DETAILED DESCRIPTION OF THE PREFERRED EMBODIMENTS

Each of the preferred embodiments of the invention will be described below referring attached drawings.

First Embodiment

Figure 1A:
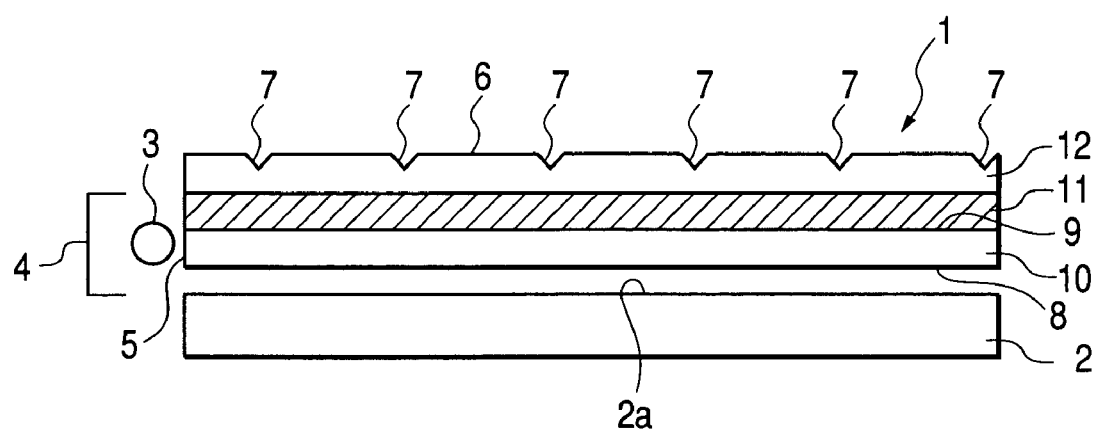
FIG. 1A is a front view of a front light according to a first embodiment.
Figure 1B:
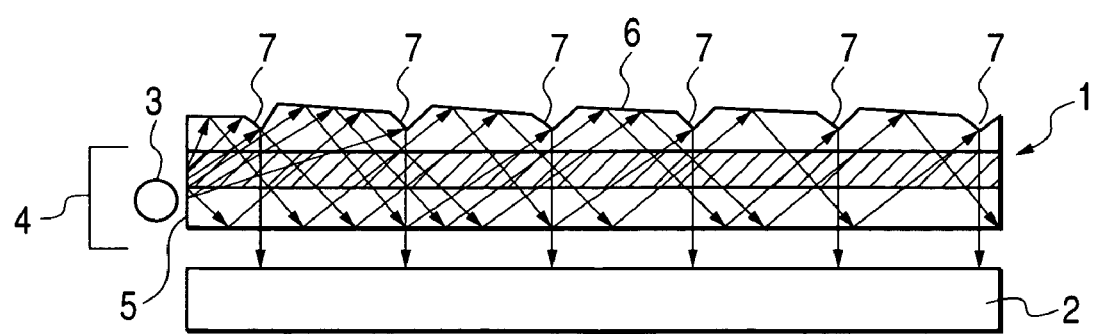
FIG. 1B is a front view of a front light showing refraction of light from a light source.

FIG. 1A is a front view of a front light and FIG. 1B is a front view showing refraction of light from a light source. Although the case using for liquid crystal display of a portable telephone as an electronic instrument is shown in the figures, it is applicable for illumination of liquid crystal for a palmtop computer or a desk top computer, and for the application, quantity of light source is increased or number of light sources is increased depending on the necessity.

In FIG. 1A, liquid crystal 2 is a reflective type TFT liquid crystal for example, and the display face 2a faces upward and is arranged oppose to a light-guide plate 1 as shown in the figure. In a light emission face 6 of the light-guide plate 1, plural prism grooves 7 are formed as shown in the figure. The light-guide plate may be formed so that plural prism grooves 7 become close state gradually in gradation shape as separating from a light source 3 or that depths of the prism grooves 7 become deep as separating from the light source 3. Here, the closer the density between lines of the prism grooves is, the brighter the light-guide plate is, and similarly the deeper the prism groove is, the brighter the light-guide plate is, therefore the rate is set suitably.

The light-guide plate 1 has a first face 8 arranged oppose to a display face 2a of the liquid crystal 2, a second face 9 of rear face side of the first face 8, and a third face 5 guiding light from the light source 3 to inside from a side face. The light-guide plate 1 is completed by laminating a base portion 10 of light permeability formed of flat plate made of acryl resin or polycarbonate resin having good light permeability, an adhesive layer 11 of photo-curing resin having light permeability for example arranged on the above second face 9, and a sheet 12 having light permeability which forms the plural prism grooves 7 obtained by processes described later on a light emission face 6 with the predetermined intervals as shown in the figures.

The light source 3 constituted by a high intensity light emitting diode surrounded by a reflective plate 4 is arranged facing the third face 5 of side face of the base portion 10 so as to perform guide of light directly to the base portion 10.

Plural prism grooves 7 are formed so as to cross at the right angle to direction of light axis from the light source 3. The prism grooves 7 reflect directly at the valley portion of the prism grooves 7 at the light source 3 side (see FIG. 1B), a part of the irradiated light is caught at the other side of higher valley portion of the prism grooves 7, the light comes in the light-guide plate 1 again so as to damage contrast of the liquid crystal 2, and illumination is performed at high state in display contrast of the liquid crystal 2 by making brightness uniform over whole plane.

Figure 11A:
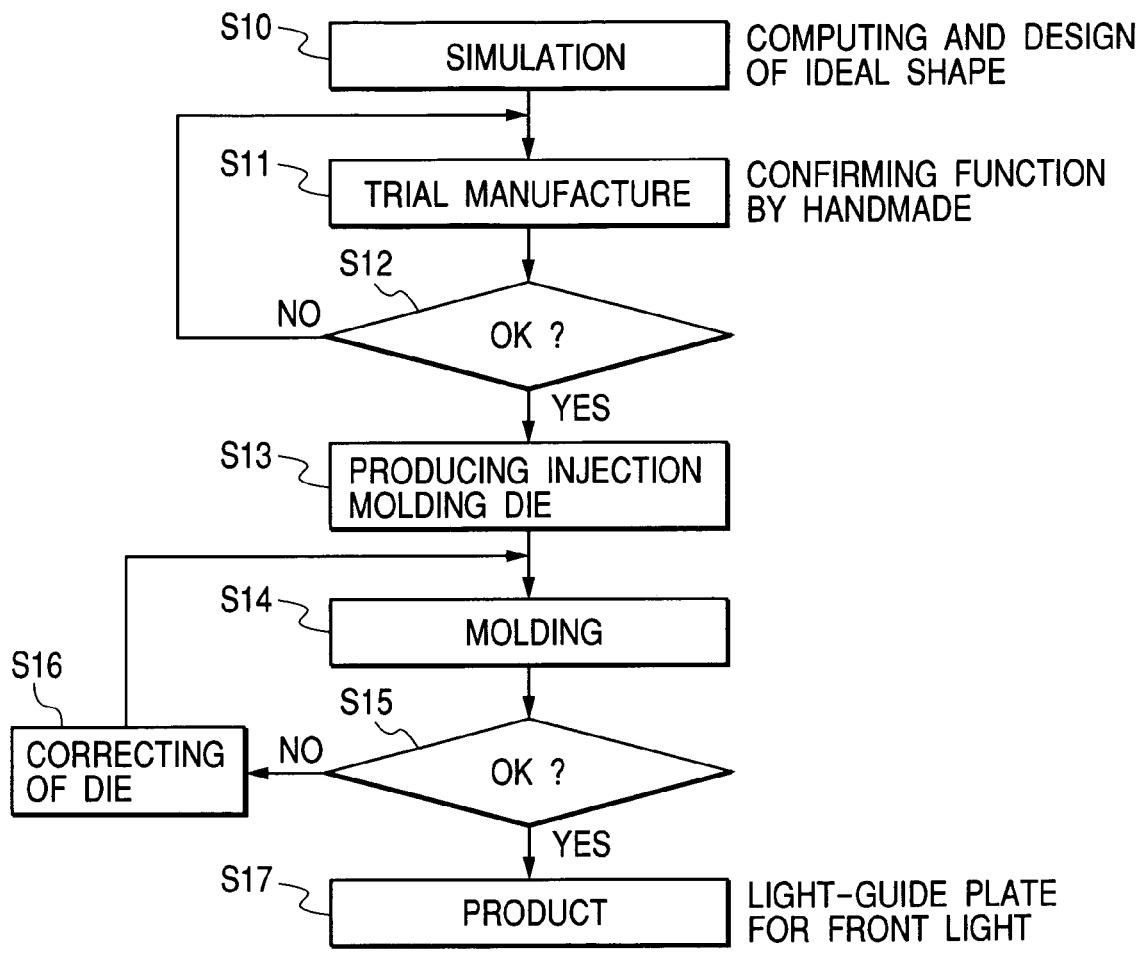
FIG. 11A is a flowchart showing processes to obtain the prior light-guide plate 1 molded integratedly.
Figure 11B:
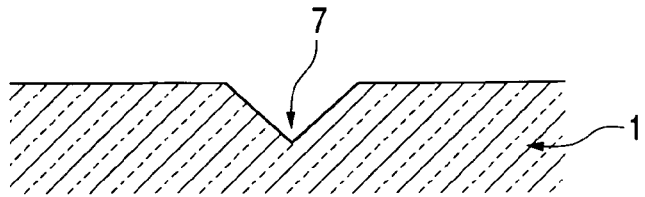
FIGS. 11B and 11C are sectional views showing light-guide plates.
Figure 11C:
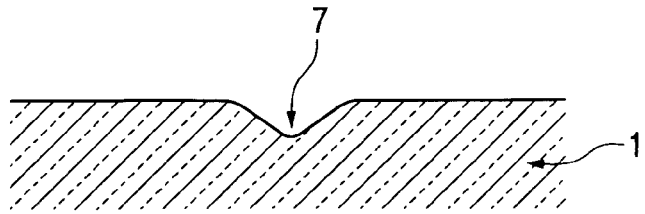

Thus, in order not to damage contrast over whole of the liquid crystal 2 by catching the light at the other side of the valley portion of the prism grooves 7 and by making the light come in the light-guide plate 1, it is necessary to mold the prism grooves 7 exactly in the valley shape having the plane as described in FIG. 11B. For the molding, a method for manufacturing by solvent casting method and melt extrusion method is adopted.

Figure 2:
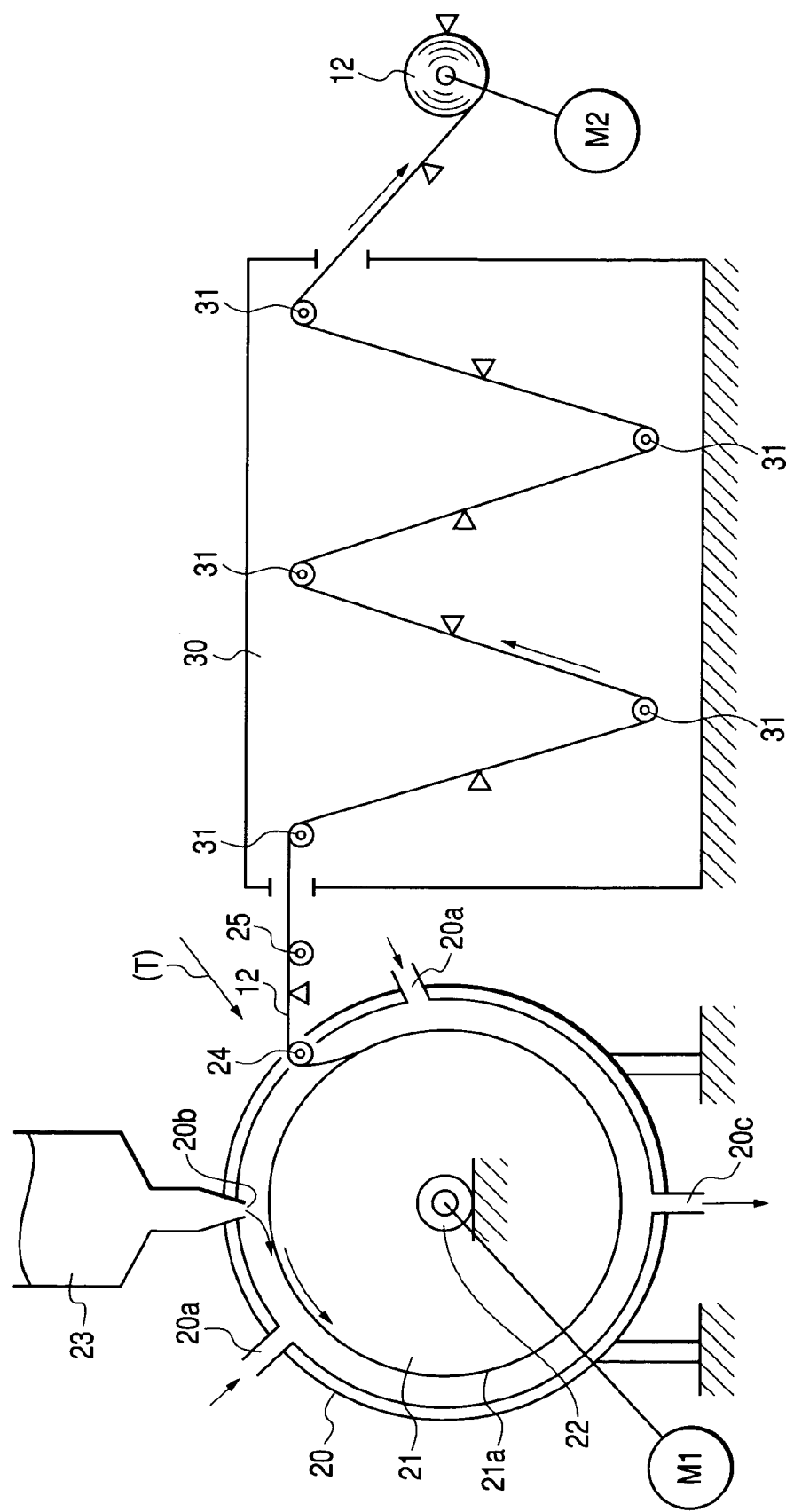
FIG. 2 is an outline of construction of a device for manufacturing a sheet 12 by solvent casting method.

FIG. 2 is an outline of construction of a device for manufacturing a sheet 12 based on solvent casting method. In the figure, a circular tube shaped vessel 20 as shown in the figure is fixed on a set plane, solution is supplied to inside of the vessel 20 through an opening portion 20b, and the solution is collected from an opening portion 20c of a bottom face. In the vessel 20, a mirror face roller 21 driven to rotate in an arrow direction by a motor M1 is supported by a shaft 22. Heated air is supplied to the mirror face roller 21 from two opening portions 20a provided at upper right and left of the vessel 20. The mirror face roller 21 is made of metal such as nickel, copper, stainless, and so on.

At upper side of the vessel 20, a supply portion for supplying melt resin material to a mirror face 21a of the mirror face roller 21 is provided.

At oblique upper right of the vessel 20, a separating roller 24 for forming continuously prism grooves of one-side shape of V is provided rotatably as described later. At right next to the separating roller 24, a carrier roller 25 is provided so as to guide the sheet 12 to a first guide roller 31 set at inside of a drying chamber 30. In the drying chamber 30, each guide roller 31 is provided rotatably in staggered shape as shown in the figure. Thus, the sheet 12 is guided making a carrier passage of the sheet 12 long, is taken out after drying remained solution on the sheet 12 during carriage, and is wound to an axis body driven by a motor M2 so as to wind.

By the above construction, melted resin is supplied to the mirror face 21a of the mirror face roller 21 from an orifice 20b of the supply portion 23, just after the sheet 12 is molded continuously on the mirror roller 21, the sheet 12 is separated from the mirror roller 21 and plural prism grooves of one side shape of V are molded by passing through on the separating roller 24 so as to obtain the sheet 12 by winding after removing solution by dry in the drying chamber 30.

Figure 3:
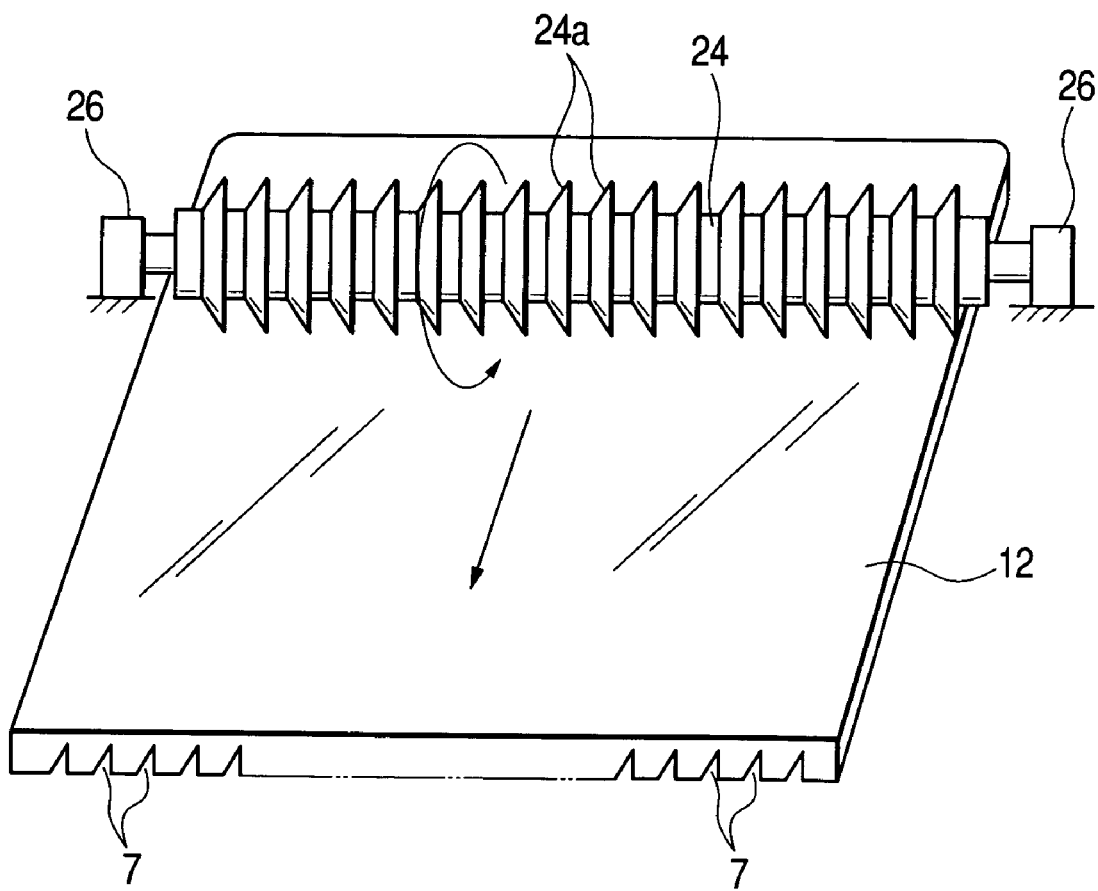
FIG. 3 is a perspective view viewed from the arrow direction (T) of FIG. 2.

In FIG. 3 being a view viewed from an arrow (T) direction of FIG. 2, both shaft ends of the separating roller 24 are supported by bearings 26 and provided rotatably in an arrow direction, and a male die 24a portion for molding plural prism grooves of one side shape of V as shown in the figure is provided in circular shape at outer circumference face. The separating roller 24 is made of metal such as nickel, copper, stainless, and so on, and can be prepared with high accuracy by lathe.

By the above construction, the sheet 12 passes on the separating roller 24 at the state that the sheet 12 is not hardened entirely just after the sheet 12 is molded continuously on the mirror roller 21, and plural prism grooves of one side shape of V are molded on the sheet 12 by turning the direction of the sheet. The prism grooves 7 formed by such the way has a shape transferring entirely a profile of circular shaped male die portion 24a of the separating roller 24.

Since the separating roller 24 is produced simply by lathe and is prepared simply and in low cost, repeating is easy when the initial performance does not show.

Figure 4:
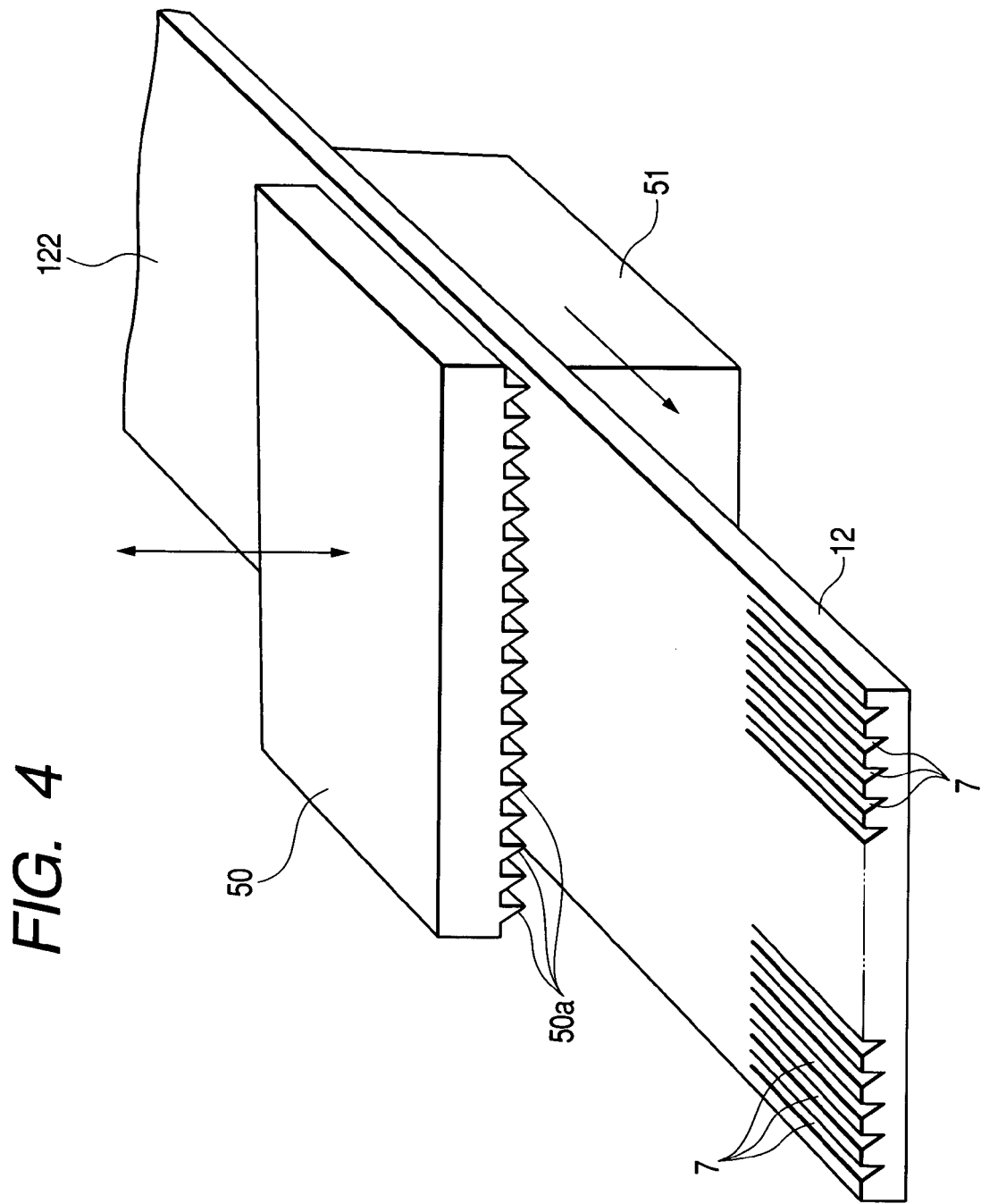
FIG. 4 is a perspective view of exterior showing the state producing the sheet 12 by melt extrusion method.

Next, FIG. 4 is a perspective view of an exterior showing the state producing the sheet 12 by melt extrusion method.

In the figure, the sheet body 22 is carried to the position of the shown figure by raising temperature higher than second order transition point and lower than melting point in the upper course process.

After carrying, the sheet body 122 is pressed by moving a press die 50 forming a male die portion 50a of the plural prism grooves of one side shape of V to a platen 51 so as to mold the plural prism grooves 7 of one side shape of V. At this time, the sheet 12 on which the prism grooves of exact shape is formed is obtained by that profiles of all male die portions 50a of the press die 50 are entirely transferred all together. When the press is performed, temperature possibly rises to 260 to 280° C. being temperature higher than melting point in the case of bad resin in transfer performance such as polyester resin for example.

After that, the sheet 12 is cut to the desired size and is bonded and fixed to the base portion 10 through the adhesive layer 11 as shown in FIG. 1.

Figure 5:
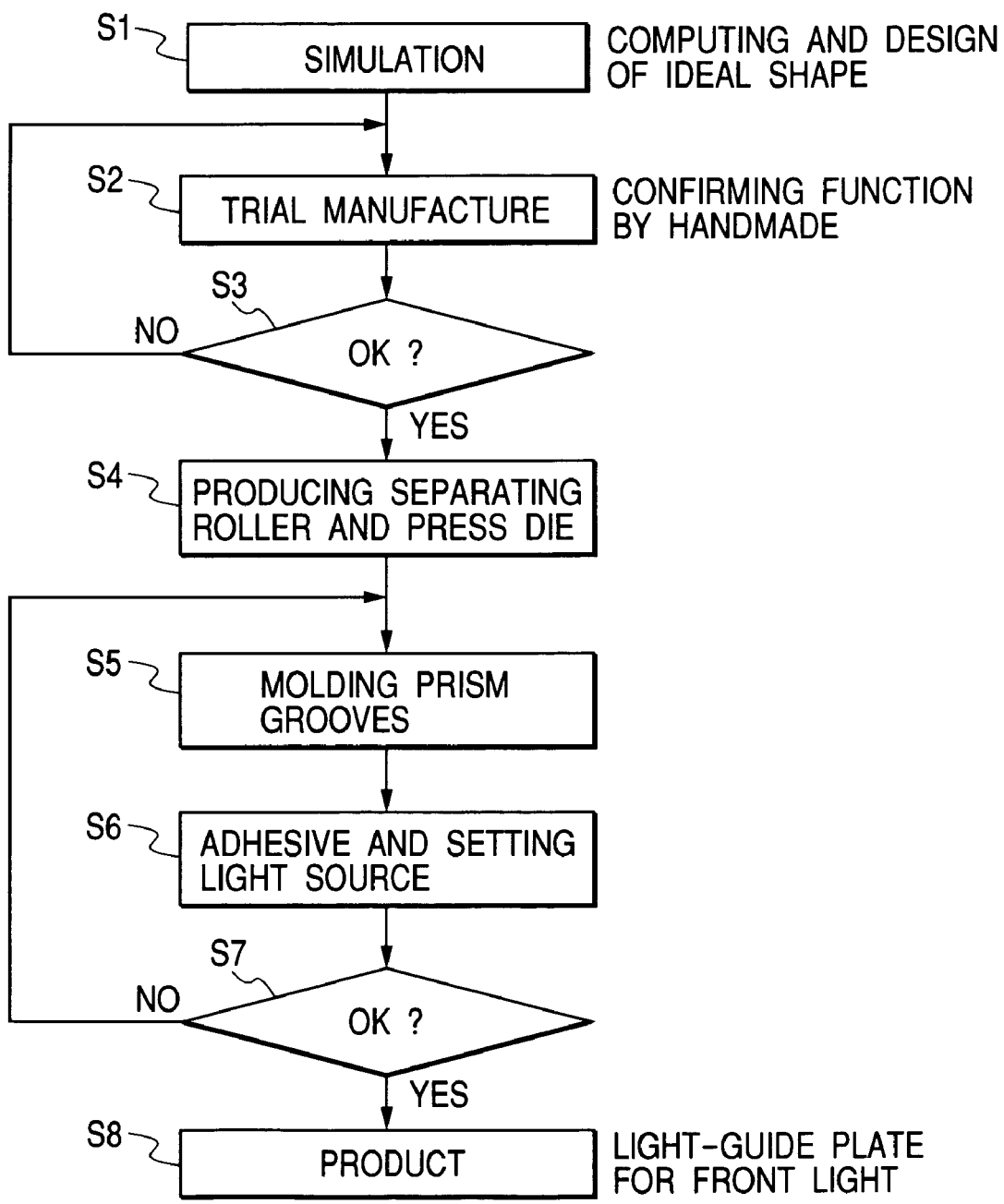
FIG. 5 is a flowchart showing processes to obtain the light-guide plate 1 shown in FIGS. 1A and 1B.

FIG. 5 is a flowchart showing processes to obtain the light-guide plate 1 shown in FIGS. 1A and 1B. In the figure, the processes will be described simply. First, size of an external form of a light-guide plate determined based on the product specification and known values of quantity of light source and directivity are inputted to a simulation program of a personal computer so as to design for trial computing ideal arrangement of prism grooves and numbers of arrangement in Step S1.

Continuously, the light-guide plate is actually produced by hand based on the design for trial in Step S2. At this time, when it is difficult to produce the sheet 12 by hand, working of the prism grooves 7 is performed to the above base portion 10 directly.

Next, it is judged whether density of quantity of light from light emission face is uniform or not by setting a light source on the trial piece in Step S3, and when it is uniform, the separating roller 24 described in FIG. 3 or the press die 50 described in FIG. 4 is produced advancing the next Step S4.

On the other hand, when density of quantity of light from light emission face of the light-guide plate is not uniform in Step S3, the light-guide plate is produced for trial again returning to Step S2 and repeats till density of quantity of light becomes uniform.

Next to the above Step S3, advancing to Step S4, the sheet 12 finishing molding of the prism grooves 7 of one side shape of V using the separating roller 24 or the press die 50 is obtained. Continuously, the sheet 12 is cut in the desired size, it is bonded on the adhesive layer 11, and the light source 3 is set after making as shown in FIG. 1 in Step S6. The decision is made as to whether density of quantity of light from light emission face 6 of the light-guide plate 1 is uniform or not in the Step S7, when it is uniform, it is shipped as a product advancing to the next Step S8.

On the other hand, when it is clear that density of quantity of light from light emission face 6 of the light-guide plate 1 is not uniform in Step S7, correction of the separating roller 24 or the press die 50 is performed returning to Step S5 and repeats Steps S6 and S7 so that density of quantity of light becomes uniform.

The light-guide plate obtained by the above processes is confirmed that the prism grooves 7 are made exactly in valley shape having planes to perform reflection of light, which is indispensable condition, and density of quantity of light emission from the light emission face 6 of the light-guide plate 1 is made uniform over whole plane.

Here, for material of the sheet 12, transparent material at visible area, for example, triacetate, polyester, polycarbonate resin are applicable. For material of the base portion 11, polycarbonate, methyl polymethacrylate resin, and ZEONEX (trademark) resin, which are transparent at visible area similarly and have moderate rigidity, are applicable. For the adhesive layer 11, denatured acryl resin, epoxy resin, and the like are applicable in the case using photo-curing resin for example. By using selectively near material in reflective index for these materials, light can be guided reflecting to a separated part from the light source 3 of the light-guide plate 1.

As described above, by producing the prism grooves 7 using solvent casting method and melt extrusion method and by adopting a very simple structure joining to the base portion 10, it is possible to correspond to ideal shape of another complex shape except the above prism grooves 7.

Mass production is possible in short time at the producing the sheet 12 and a unit cost of the product is depressed because of reduction of man-hour. Further, since heat cycle of every one process is not applied as the injection-molding die, long life of the manufacturing device is realized.

As described above, according to the invention, it is possible to produce a light-guide plate requiring high accuracy with a little man-hour without using the injection-molding die for molding the light-guide plate having the prism grooves.

Second Embodiment

Figure 6A:
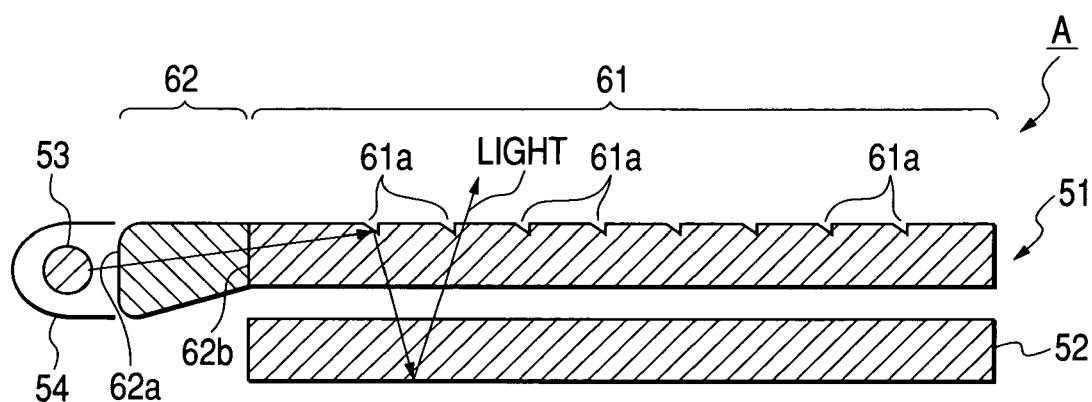
FIG. 6A is a sectional view showing a structure of a front light A using a light-guide member 51 according to a second embodiment of the invention.
Figure 6B:
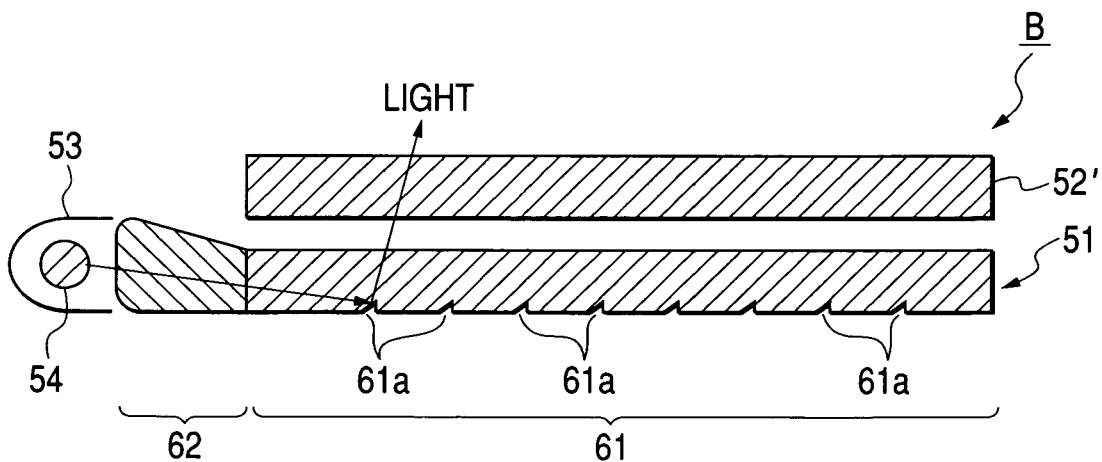
FIG. 6B is a sectional view showing a structure of a back light B using the light-guide member 51.

A second embodiment of the invention will be described below with reference to the figures. FIG. 6A is a sectional view showing a structure of a front light A using a light-guide member 51 according to a second embodiment of the invention, FIG. 6B is a sectional view showing a structure of a back light B using the light-guide member 51.

First, the front light A will be described referring FIG. 6A. The front light A is provided with a light-guide member 51 having a light emission portion 61 and a light incident portion 62, a reflective type liquid crystal display board 52 arranged under the light emission portion 61, a light source 53 of line shape for emitting light to the light incident portion 62, and a reflective member 54 partly surrounding the light source 53 and being mirror-worked at inside face.

The light emission portion 61 of the light-guide member 51 is a member of rectangular plate shape. Plural prism grooves 61a being triangle in section and formed in line shape are made almost parallel on the upper face of the light emission portion 61 as a light emission pattern. Various kinds of the light emission patterns are proposed other than the prism grooves 61a, and technique forming in gradation shape adjusting the coarse and fine grooves is proposed, and it is possible to select suitably. Although the prism grooves 61a are expressed simply for the convenience of describing in FIG. 6A, actually it is general to form a fine pattern of about several ten μm in pitch and depth for example.

The light incident portion 62 includes a light source side end portion 62a arranged facing the light source 53, is connected to the light emission portion 61 at a light emission side end portion 62b, and is formed with the light emission portion 61 integratedly. Here, in the embodiment, thickness of the light source side end portion 62a of the light incident portion 62 is thicker than thickness of the light emission portion 61. The construction is performed for making whole front light A thin by making the light emission portion 61 as thin as possible and for improving usage efficiency of light from the light source 53.

That is, when light from the light source 53 is irradiated to the side face of the light emission portion 61, usage efficiency of light decreases because thin light emission portion 61 makes width of side face thereof small. However in the embodiment, by providing the light incident portion 62 aside from the light emission portion 61 and by making thickness of the light source side end portion 62a thicker than a certain value, making whole front light A thin is designed and usage efficiency of light is improved. The liquid crystal display board 52 is arranged at almost just under the light emission portion 61 without arranging it at lower side of the light incident portion 62. Therefore, the liquid crystal display board 52 does not receive interference from the light incident portion 62 at arranging closely the liquid crystal display board 52 to the light emission portion 61 so as to design making the whole front light A thin.

The light source 53 is a light source of line shape such as a cold cathode tube and the like and light from the light source 53 is guided to the light incident portion 62 efficiently reflecting at inside face of a reflective member.

In the front light A consisting of such the construction, light from the light source 53 is guided from the light incident portion 62, reflects to the prism grooves 61a formed at the light emission portion 61, faces the liquid crystal display board 52, further reflects at the liquid crystal display board 52, and emits from the upper face of the light emission portion 61. As the result, brightness of the liquid crystal display board 52 improves so that display easy to see is possible.

Although the back light B is similar in the fundamental structure as the front light A, different points are points that the light-guide member 51 is arranged reversely up and down and a transparent type liquid crystal display board 52' is arranged at the upper side of the light emission portion 61. In the back light B, light from the light source 53 is guided from the light incident portion 62, reflects to the prism grooves 61a formed at the light emission portion 61, faces the liquid crystal display board 52'. As the result, brightness of the liquid crystal display board 52' improves so that display easy to see is possible.

Thus, the light-guide member 51 of the embodiment is usable for both of the front light and the back light.

Next, a method for manufacturing such the light-guide member 51 will be described. In the embodiment, the light emission portion 61 forming the prism grooves 61a being light emission pattern by press working is produced, after that, the light incident portion 62 is molded to the light emission portion 61 integratedly.

Figure 7A:
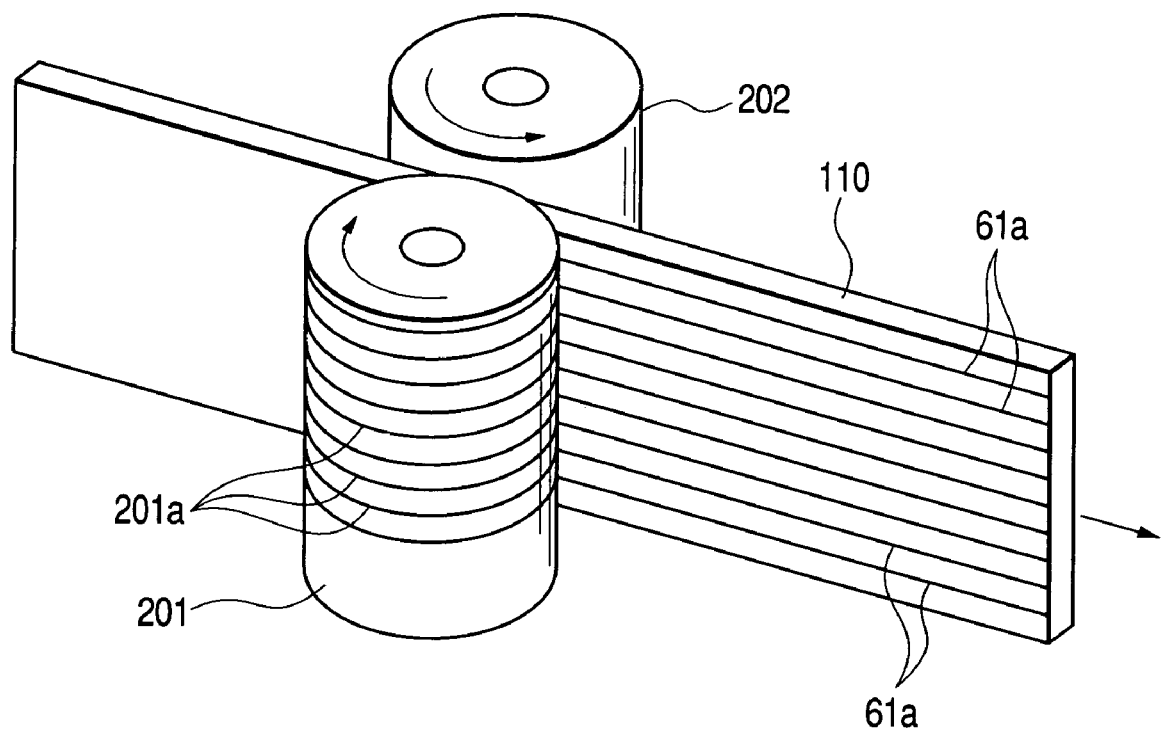
FIGS. 7A and 7B are views showing examples producing prism grooves 61a by press working.
Figure 7B:
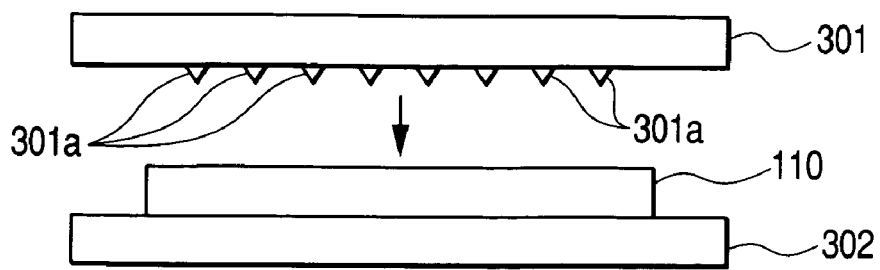

First, processes producing the light emission portion 61 forming the prism grooves 61a will be described. FIGS. 7A and 7B are views showing examples producing prism grooves 61a by press working.

In FIG. 7A, a base material 110 constituting the light emission portion 61 is pressed between a pair of press rolls 201 and 202. The base material 110 is a transparent board of plate shape such as PMMA (methacryl resin), PC (polycarbonate resin), polyolefin and the like for example. In the press roll 201, a pattern corresponding to the light emission pattern of the light emission portion 61 is formed at circumference face. Since the prism grooves 61a is adopted as a light emission pattern of the light emission portion 61 in the embodiment, plural projections of line shape having shape corresponding to the prism grooves 61a are provided in almost parallel around the roll. Circumference face of the press roll 202 is constructed in even.

When the press rolls 201 and 202 rotate to the arrow direction of the figure at the state sandwiching the base material 110 while applying load by the press rolls 201 and 202, the base material 110 is pressed between the press rolls 201 and 202 and the prism grooves 61a are formed at one surface of the base material 110 by projections 201a provided at the press roll 201 around. At this time, it is desirable to soften the base material 110 by heating so that the prism grooves 61a are formed smoothly and life of the press rolls 201 and 202 lengthens. A heater performing such the heating may be provided at any of the press rolls 201 and 202.

After that, the base material 110 forming the prism grooves 61a is cut to size corresponding to the light emission portion 61 so as to produce the light emission portion 61. Off course, after the base material 110 is previously cut to size corresponding to the light emission portion 61, the prism grooves 61a may be formed passing through the press rolls 201 and 202.

In forming the light emission pattern by press work, the light emission pattern can be formed accurately on the base material 110 without influence of thickness of the base material 110 comparing with the case of prior injection molding so as to produce thicker the light emission portion 61. Collapse of groove shape and the like can be depressed to a minimum by forming the prism grooves 61a in parallel to rotating direction of the press roll 201 as FIG. 7A.

FIG. 7B shows an example adopting press plates 301 and 302 instead of the press rolls 201 and 202. At the lower face of the press plate 301, a pattern corresponding to light emission pattern of the light emission portion 61 is formed. Since the prism grooves 61a is adopted for the light emission pattern of the light emission portion 61 in the embodiment, plural projections of line shape having shape corresponding to the prism grooves 61a are provided around. The upper face of the press plate 302 is constructed in flat.

In the case of FIG. 7B, the base material 110 is pressed between the press plates 301 and 302 lowering the press plate 301 at the state arranging the base material 110 on the press plate 302. At this time, the prism grooves 61a (not shown in FIG. 7B) are formed on the base material 110 by the projections 301a of the press plate 301.

Figure 8A:
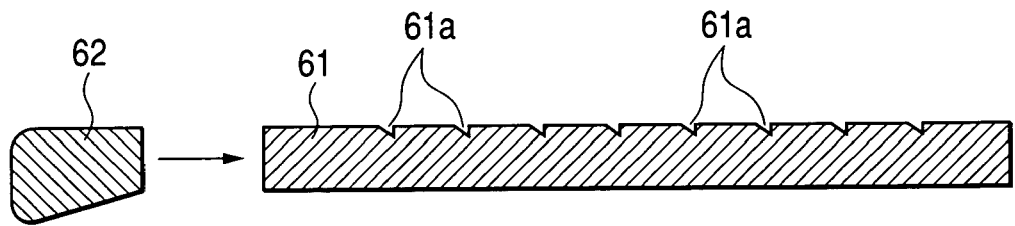
FIGS. 8A to 8C are views showing an example of technique forming a light emission portion 61 and light incident portion 62 integratedly.
Figure 8B:
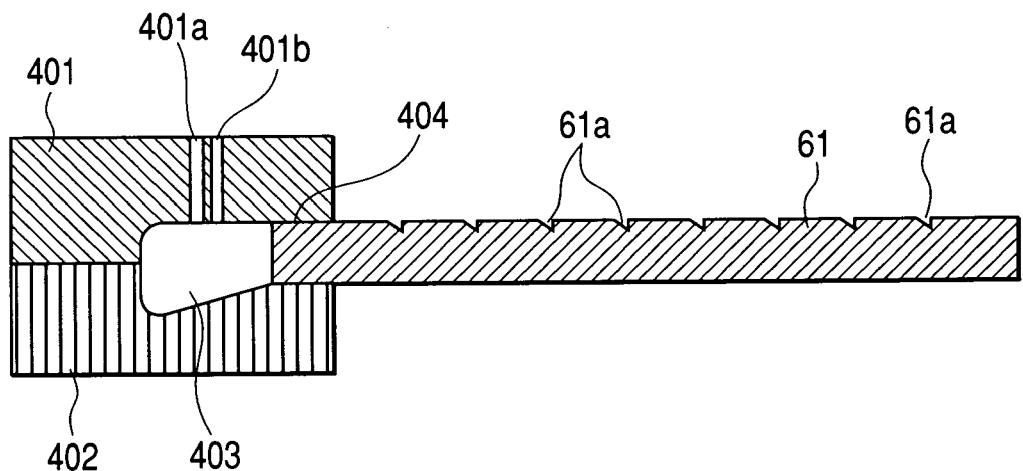
Figure 8C:
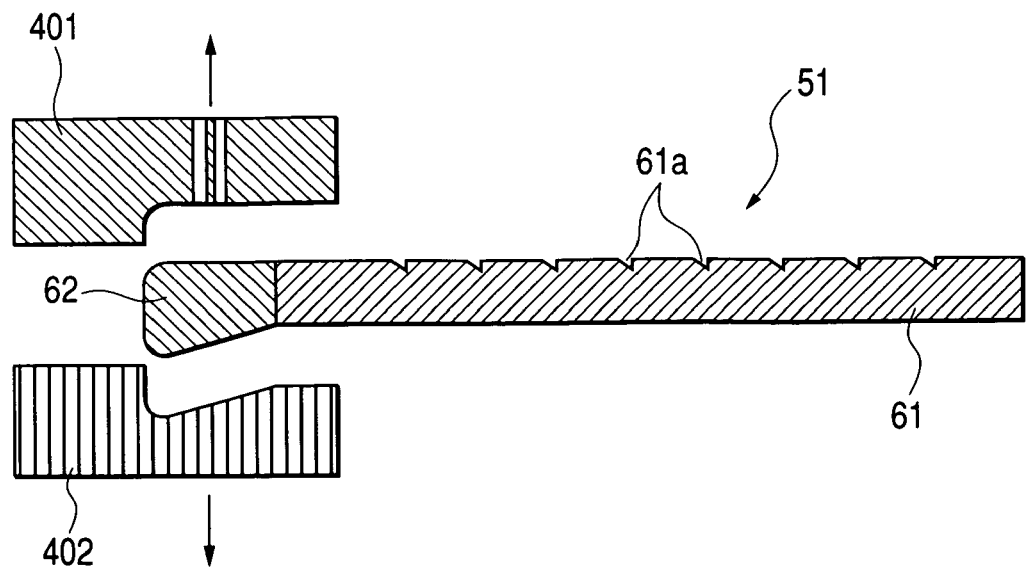

Next, processes forming the light incident portion 62 integratedly at light emission portion 61 produced by such the way will be described. FIGS. 8A to 8C, are views showing an example of technique forming a light emission portion 61 and light incident portion 62 integratedly. For material of the light incident portion 62, for example, thermosetting resin including unsaturated polyester resin, diarylphthalate resin, and the like, and photo-curing resin including acryl-acid ester base, unsaturated polyester resin base, and the like are desirable. Material same or near in reflective index as material of the light emission portion 61 is desirable, and propagation efficiency of light to the light emission portion 61 from the light incident portion 62 is good.

FIG. 8A shows a case that the light incident portion 62 is prepared besides the light emission portion 61 and the both are joined. For method of joining, for example, bonding by adhesive agent, ultrasonic melting, and the like are mentioned.

FIGS. 8B through 8C are examples forming the light emission portion 61 integratedly at the same time forming the light incident portion 62 by using dies 401 and 402. In the dies 401 and 402, a cavity 403 corresponding to an external form of the light incident portion 62 is formed, and an injecting port 401a of material constructing the light incident portion 62 and an air vent hole 401b are provided at the die 401.

Material constituting the light incident portion 62 is introduced into the cavity 403 from the injecting port 401a and is filled as shown in FIG. 8B. Then, the light-guide member 51 in which the light incident portion 62 and the light emission portion 61 are integrally formed each other completes by removing the dies 401 and 402 after the filled material hardens.

Since optional shape can be adopted for the light incident portion 62 according to the method for manufacturing such the light-guide member 51, the light-guide member 51 not reducing usage efficiency of light can be produced even if the light emission portion 61 is made thin. Since optional shape can be made for the light incident portion 62, the following embodiment can be adopted.

Figure 9A:
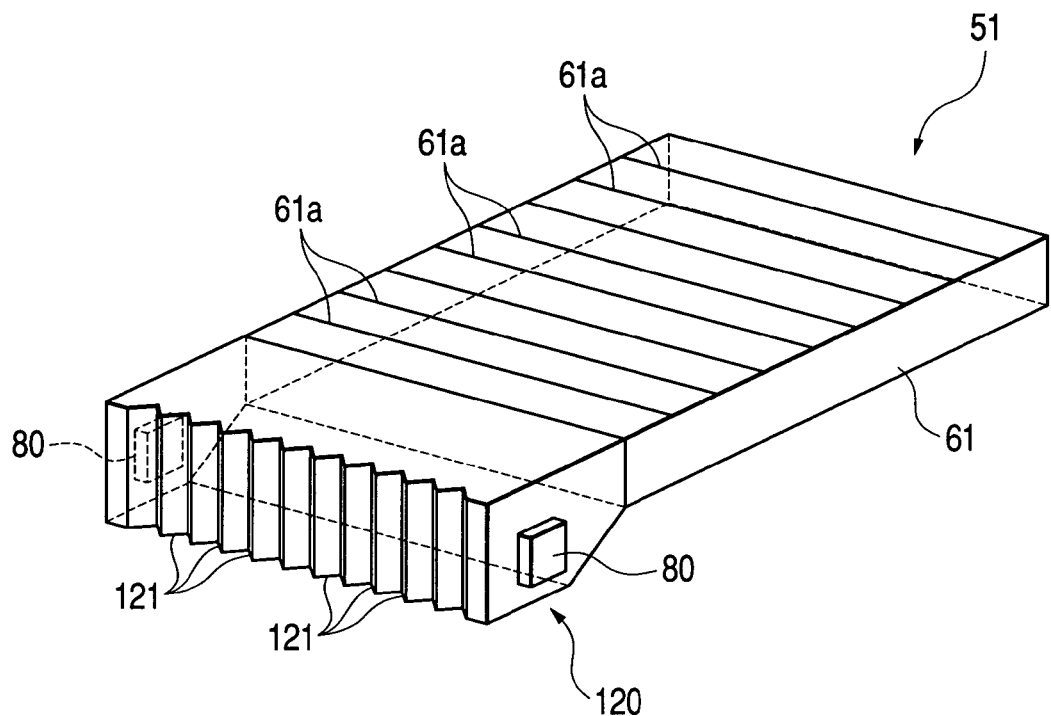
FIG. 9A is an exterior view of an another light-guide member 51.
Figure 9B:
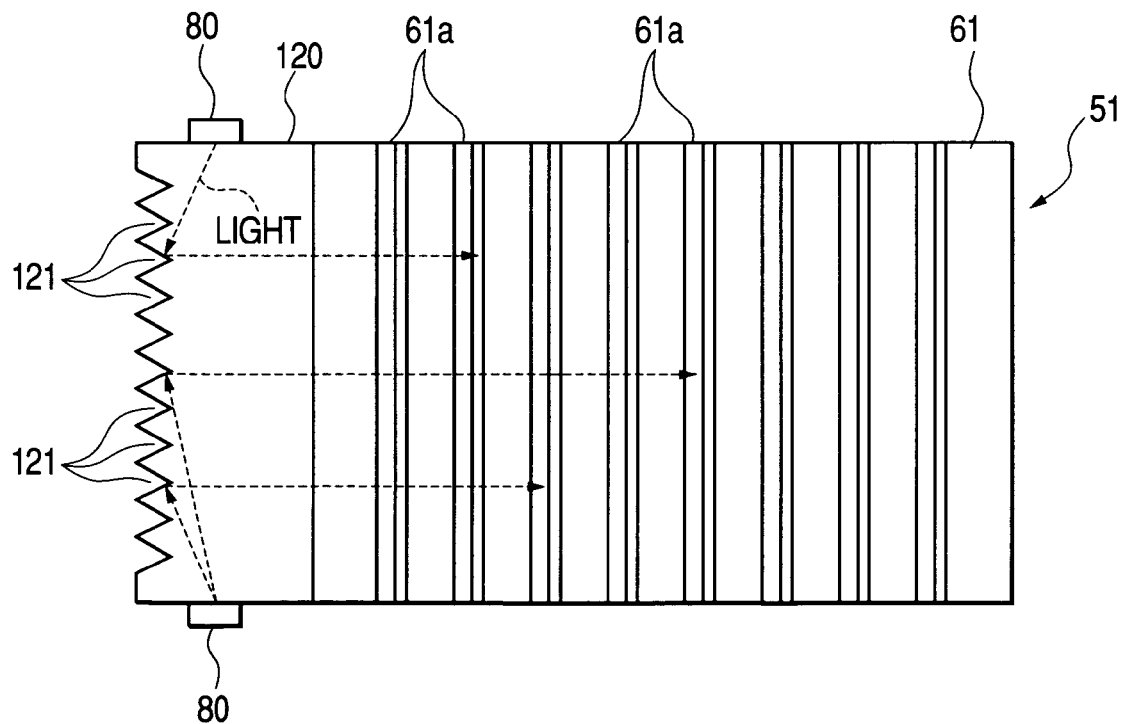
FIG. 9B is a plane view thereof.

FIGS. 9A and 9B are views showing another examples of the light-guide member 51, FIG. 9A is an external view thereof, and FIG. 9B is a plane view thereof. The examples of FIGS. 9A and 9B show an embodiment of the case adopting a point shape light source such as an LED and the like instead of the line shape light source for the light source, and the light emission portion 61 is same as the above-mentioned.

In the example, a reflective portion reflecting light from the point light source is provided at the light incident portion 120. In detail, light from the point light source is converted to parallel light like the case using the line shape light source by the reflecting portion so as to come into the light emission portion 61.

Light sources 80 of point shape are arranged at facing two side faces in the light incident portion 120, and at the front face, plural grooves 121 are formed.

The grooves 121 is grooves for reflecting the light from the light sources 80 to direction of the light emission portion 61 as shown in FIG. 9B, and prism grooves of triangle in section are adopted in the embodiment. The principle of the reflection is same as the prism grooves 61a provided at the light emission portion 61.

By reflecting the light from the light sources 80 to direction of the light emission portion 61, the similar light emission as the case using the line shape light source is performed while using the point shape light source 80. When the light sources are arranged between the light incident portion 120 and the light emission portion 61 so as to join through slight gap in the example, conversion to line shape light source from the point shaped light source is obtained more effectively so that it is effective.

Figure 10:
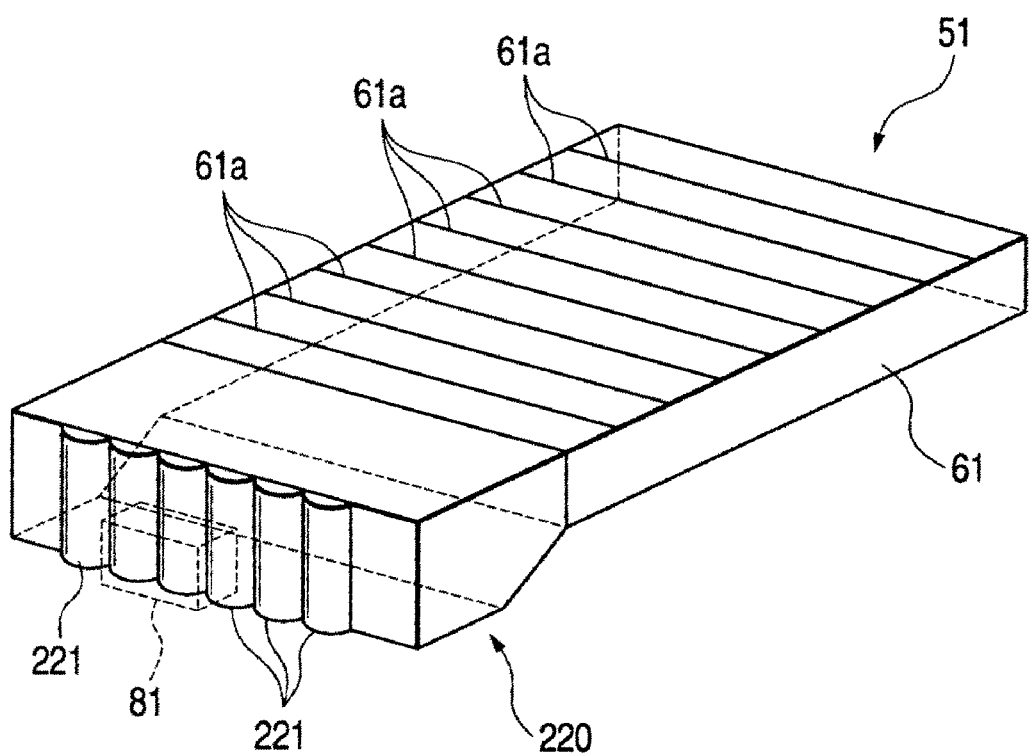
FIG. 10 is an exterior view showing a further another light-guide member 51.

FIG. 10 is an external view showing further another example of the light-guide member 51. The example of FIG. 10 too shows an embodiment of the case adopting a point shape light source such as an LED and the like instead of the line shape light source for the light source, and the light emission portion 61 is same as the above-mentioned.

In the example, a light incident portion 220 adopts micro lenses instead of the above grooves 121. At the front face of the light incident portion 220, plural micro lenses 221 are provided, and the point light sources 81 are arranged at the micro lenses 221 facing each other. The micro lenses 221 are provided in half-columnar shape, section of which is half-circular shape and which extends to upper and lower direction in the example. Although the micro lenses 221 in the example have such the construction, various kinds of embodiments are selectable in embodiments of arrangement.

By providing such the micro lenses 221, light coming into the light incident portion 22 from the light source 81 is scattered to come into so that distribution of light in the emission portion 61 becomes uniform.

As described above, according to the invention, it is possible to realize a thin light-guide member while keeping usage efficiency of light source.

What is claimed is:

1. A light-guide plate for a front light type liquid crystal display device comprising:
   a light permeable board for mounting on a front face of a liquid crystal display device;
   a light permeable sheet laminated on the light permeable board and comprising plural grooves and a light emission face, wherein said plural grooves are spaced apart across said light emission face, and wherein the light permeable board and the light permeable sheet form a side face receiving light from a light source; and
   a light incident portion on said side face having a thickness that decreases in a direction that is substantially perpendicular to said side face, wherein said light incident portion comprises a plurality of micro lenses which are provided at a light incident end surface which is a thicker side of the light incident portion, the light incident end surface being located opposed to the side face.

2. The light-guide plate of claim 1, wherein the light permeable board and the light permeable sheet are joined to each other by a light permeable adhesive agent.

3. The light-guide plate of claim 1, wherein the light permeable board comprises:
   a front face facing a liquid crystal display face, and
   a rear face laminated to the light permeable sheet,
   wherein the plural grooves are prism grooves crossing at substantially a right angle to a light axis direction of a light from the light source.

4. A light-guide member comprising:
   a light emission portion comprising a press-worked light emission pattern; and
   an incident portion integral with the light emission portion, wherein said light emission pattern comprises a plurality of prism grooves spaced apart from each other on a light emitting surface of said light emission portion, and wherein a thickness of the incident portion decreases in a direction substantially perpendicular to a side face of said light emission portion, wherein a light incident end surface of said incident portion comprises a plurality of micro lenses which are provided at a light incident end surface which is a thicker side of the incident portion, the light incident end surface being located opposed to the side face.

5. A light-guide member comprising:
   a plate-shaped light emission portion comprising a light emission pattern; and
   a light incident portion integral with the plate-shaped light emission portion and comprising a light source side end portion facing a light source, the light source side end portion being thicker than a light emission portion of said light incident portion, wherein said light emission pattern comprises a plurality of prism grooves spaced from each other on a light emitting surface of said plate-shaped light emission portion, and wherein the thickness of said light incident portion decreases in a direction that is substantially perpendicular to a side face of the plate-shaped tight emission portion, wherein a light incident end surface of said light incident portion comprises a plurality of micro lenses which are provided at a light incident end surface which is a thicker side of the light incident portion, the light incident end surface being located opposed to the side face.

6. A light guide plate comprising:
   a light permeable board;
   a light permeable sheet laminated on said light permeable board, wherein said light permeable sheet comprises a plurality of prism grooves that are spaced apart from each other on a light emitting surface, and wherein the light permeable board and the light permeable sheet form a side face receiving light from a light source; and
   a light incident portion on the side face having a thickness that decreases in a direction that is substantially perpendicular to the side face, wherein a light incident end surface of said light incident portion comprises a plurality of micro lenses which are provided at a light incident end surface which is a thicker side of the light incident portion, the light incident end surface being located opposed to the side face.

7. The light guide plate of claim 6, further comprising an adhesive layer between said light permeable board and said light permeable sheet.

8. The light guide plate of claim 6, wherein the spacing between said plurality of prism grooves is substantially constant.

9. The light guide plate of claim 6, wherein the spacing between said plurality of prism grooves reduces relative to the distance from an end side of said light permeable board.

10. The light guide plate of claim 6, wherein the depth of said plurality of prism grooves is substantially constant.

11. The light guide plate of claim 6, wherein the depth of said plurality of prism grooves increases relative to the distance from an end side of said light permeable board.

12. The light guide plate of claim 6, wherein at least two of said plurality of prism grooves are spaced apart from each other by a portion of said light emitting surface.

13. A light guide comprising:
   a plate-shaped light emission portion comprising a light emitting surface and a light incident end surface; and
   a light incident portion comprising a light incident end surface and a light emitting surface that abuts said light incident end surface of said plate-shaped light emission portion, wherein said plate-shaped light emission portion comprises a plurality of prism grooves spaced apart across said light emitting surface and wherein the thickness of said light incident portion decreases in a direction that is substantially perpendicular to said light incident end surface of said plate-shaped light emission portion, wherein said light incident end surface of said light incident portion comprises a plurality of micro lenses which are provided at a light incident end surface which is a thicker side of the light incident portion, the light incident end surface being located opposed to the side face.

14. The light guide of claim 13, further comprising at least one point-shaped light source at one of said plurality of micro lenses.

15. The light guide of claim 13, wherein at least one of said plurality of micro lenses has a half-columnar shape.

16. A liquid crystal display comprising:
a reflective type liquid crystal; and
a light-guide plate on a front face of said liquid crystal, said light-guide member comprising:
a light permeable board;
a light permeable sheet laminated on said light permeable board, wherein said light permeable sheet comprises a plurality of prism grooves that are spaced apart from each other on a light emitting surface, and wherein the light permeable board and the light permeable sheet form a side face receiving light from a light source; and
a light incident portion on the side face having a thickness that decreases in a direction that is substantially perpendicular to the side face, wherein said light incident end surface of said light incident portion comprises a plurality of micro lenses which are provided at a light incident end surface which is a thicker side of the light incident portion, the light incident end surface being located opposed to the side face.

* * * * *